Oct. 9, 1956  J. M. CHAMBERS ET AL  2,765,627
CONTROL MECHANISM FOR TRACTOR HYDRAULIC SYSTEMS
Filed Aug. 31, 1953  3 Sheets-Sheet 3

INVENTORS.
JOHN MALET CHAMBERS &
JAMES CURTIS MC NEICE
BY
*Carlson, Pitzner, Hubbard & Wolfe*
ATTORNEYS.

United States Patent Office 2,765,627
Patented Oct. 9, 1956

2,765,627

CONTROL MECHANISM FOR TRACTOR HYDRAULIC SYSTEMS

John Malet Chambers, Blackdown Hill, Leamington Spa, and James Curtis McNeice, Lillington, Leamington Spa, England, assignors to Massey-Harris-Ferguson (Sales) Limited, a British company Application August 31, 1953, Serial No. 377,585

Claims priority, application Great Britain September 1, 1952

8 Claims. (Cl. 60—97)

The invention relates to hydraulic lift systems for tractors and more particularly to improved control mechanism for use in such systems. A system of the general character contemplated is disclosed in the Ferguson Patent No. 2,118,180, issued May 24, 1938.

Power lift systems of the above general type are conventionally utilized for raising and lowering the hitch linkage by which an implement is operatively connected with a tractor. Power for effecting such action is applied through a hydraulic actuator or ram supplied with pressure fluid by a pump driven from the tractor engine. Operation of the system is controlled by valve mechanism arranged for actuation either automatically in response to the draft load imposed on the hitch linkage or manually by means of a suitable control device such as a hand lever. The valve mechanism commonly has three positions, namely, a "lift" position in which pressure fluid is delivered to the ram to raise the linkage, a "drop" position in which pressure fluid is permitted to exhaust from the ram as the linkage descends under the action of the gravity load imposed thereon, and a "neutral" position in which the pressure fluid is trapped in the ram so that the hitch linkage is held in a fixed position.

Tractor hydraulic systems of the above type may also be utilized for operating one or more auxiliary hydraulic actuators which may be carried by the tractor or by an implement or the like hitched to the tractor. For this purpose, provision is made for the connection of a supply conduit to the pressure side of the hydraulic system whereby pressure fluid may be delivered to the auxiliary actuator or actuators through suitable control valve mechanism mounted externally of the tractor body.

One object of the invention is to provide improved control mechanism for controlling the operation of one or more auxiliary actuators associated with and actuated by pressure fluid received from the tractor hydraulic system which mechanism is simple in construction, easy to mount on the tractor, convenient to operate and which effectively protects the system against damage from overloads imposed on the auxiliary actuator or actuators.

Another object is to provide control mechanism including novel valve means adapted to relieve excessive pressure in the supply line for the auxiliary actuators and operable through the medium of the manual controller of the tractor hydraulic system to provide for quickly venting the auxiliary actuators.

Another object is to provide control mechanism of the above type which can be quickly and easily disassociated from the regular controls of the tractor hydraulic system so that the tractor may be operated in the usual manner without requiring removal of the control mechanism therefrom.

Still another object is to provide a control mechanism including valve means adapted to function both as a pressure relief valve and as a vent or dump valve, the latter function being under control of the hand lever normally controlling the lifting and lowering actions of the tractor hydraulic system.

A further object is to provide control mechanism including valve means for selectively determining the order of operation of a plurality of auxiliary actuators associated with the tractor hydraulic system which valve means may be biased to provide for operation initially of a particular one of the actuators without requiring manual intervention and which may be set to lock all of the actuators against further operation when desired.

It is also an object of the invention to provide novel actuating mechanism by which the conventional hand lever provided on the tractor for controlling the hydraulic lift may be utilized to actuate auxiliary control mechanism and which provides a relatively large, easily found range in which the auxiliary mechanism is in a "neutral" or holding condition.

Other objects and advantages of the invention will become apparent from the following detailed description of the preferred embodiment in which.

Figure 1:
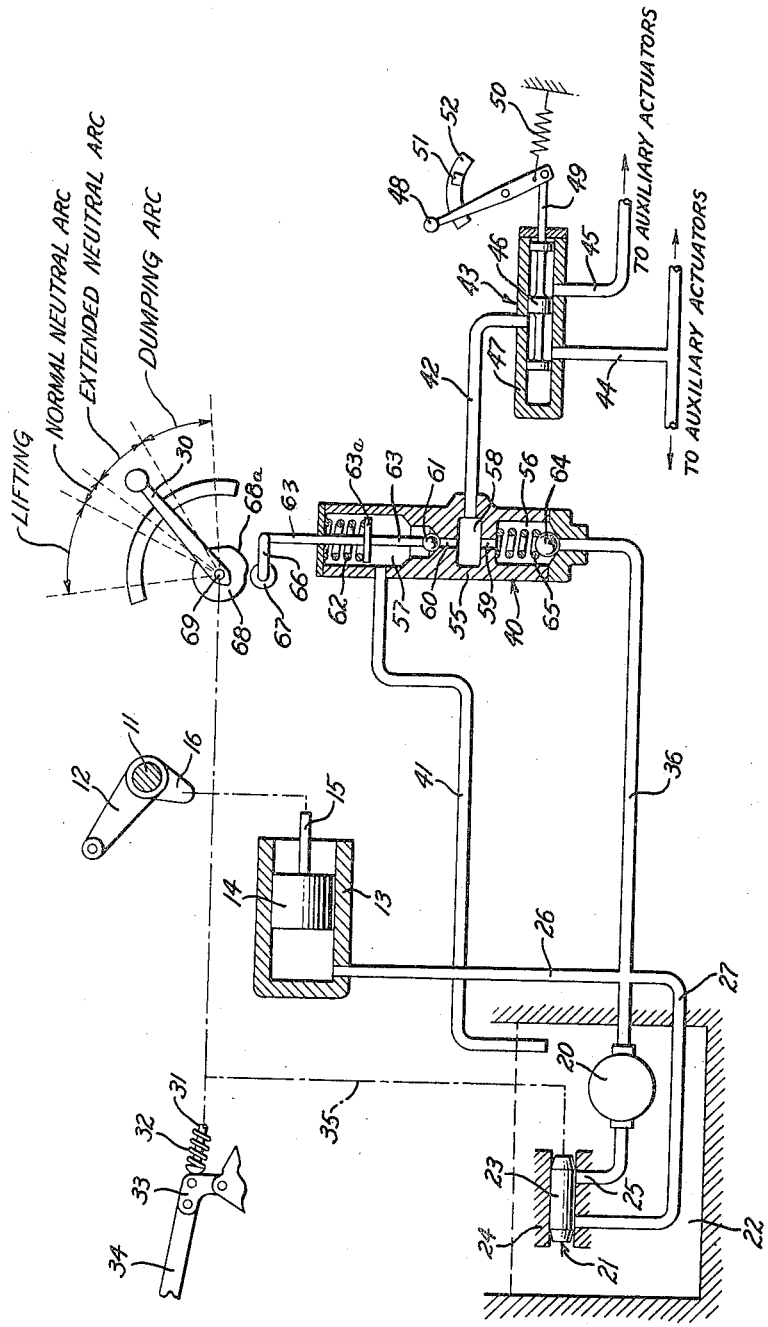
Figure 1 is a diagram of a tractor hydraulic system with control mechanism embodying features of the present invention incorporated therein.

While a preferred embodiment of the invention has been shown in the drawings and will be described in detail herein, it is not intended to limit the invention to the specific form disclosed. On the contrary, the intention is to cover all modifications and alternative constructions falling within the spirit and scope of the invention as expressed in the appended claims.

In the preferred form herein disclosed, the control mechanism constituting the invention is in the nature of an auxiliary assembly or attachment adapted to be installed on tractors equipped with hydraulic lifts of the type disclosed in the Ferguson patent above mentioned. When installed on the tractor, the mechanism becomes an integrated part of the tractor hydraulic system and adapts that system for the operation of one or more auxiliary hydraulic actuators. It will be helpful therefore to consider briefly the construction and mode of operation of the tractor hydraulic system preliminary to describing the invention itself.

Figure 2:
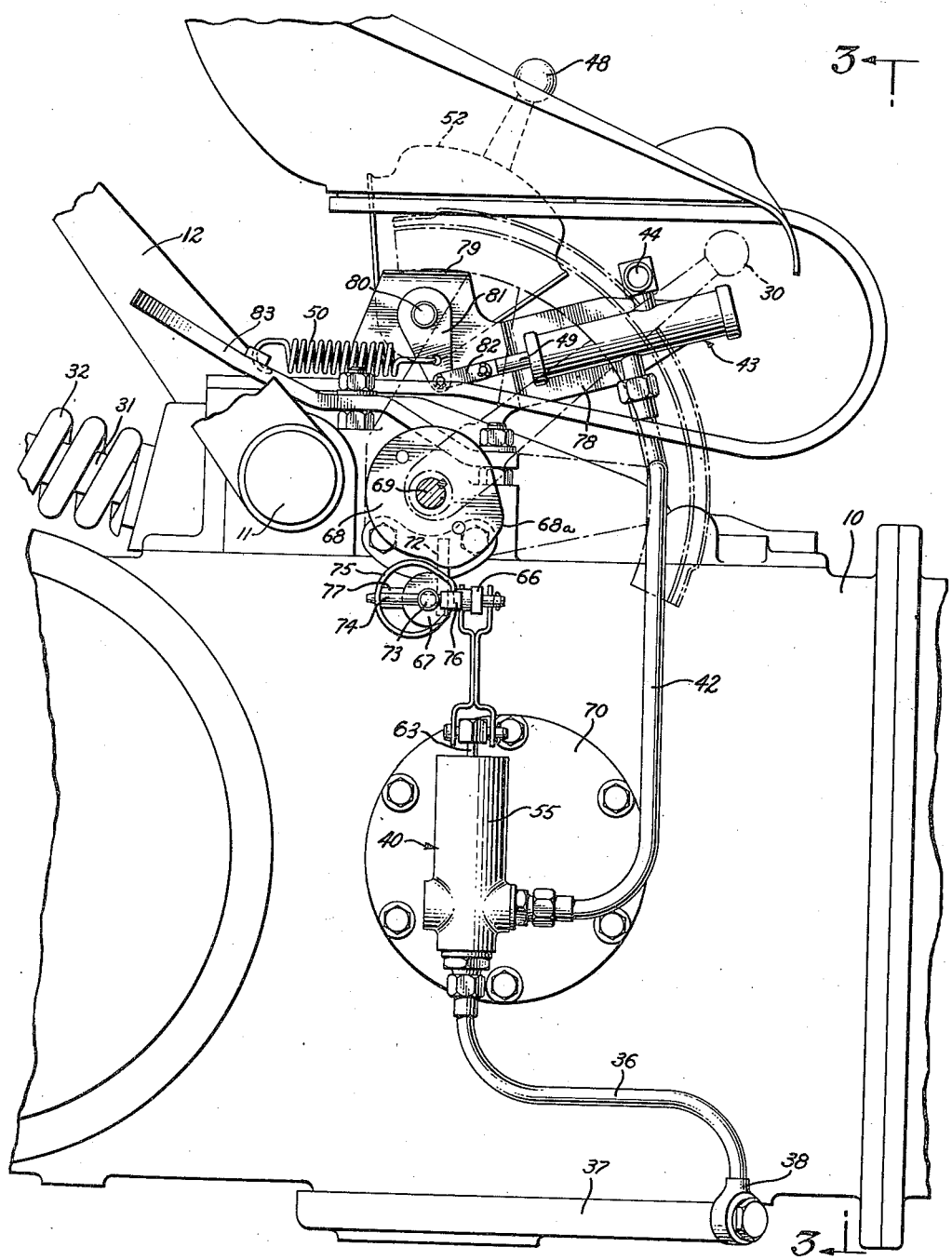
Fig. 2 is a side elevational view of the control mechanism mounted on a tractor.
Figure 3:
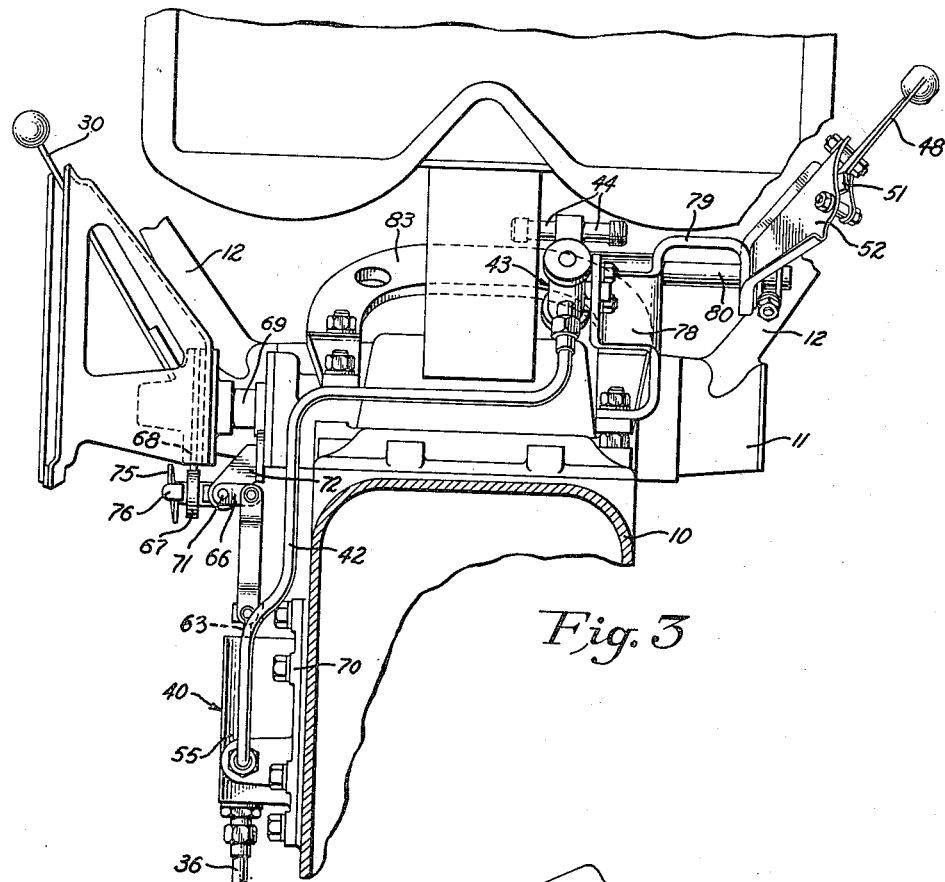
Fig. 3 is a transverse sectional view of the tractor taken in a vertical plane substantially on the line 3—3 of Fig. 2 showing details of the control mechanism.
Figure 4:
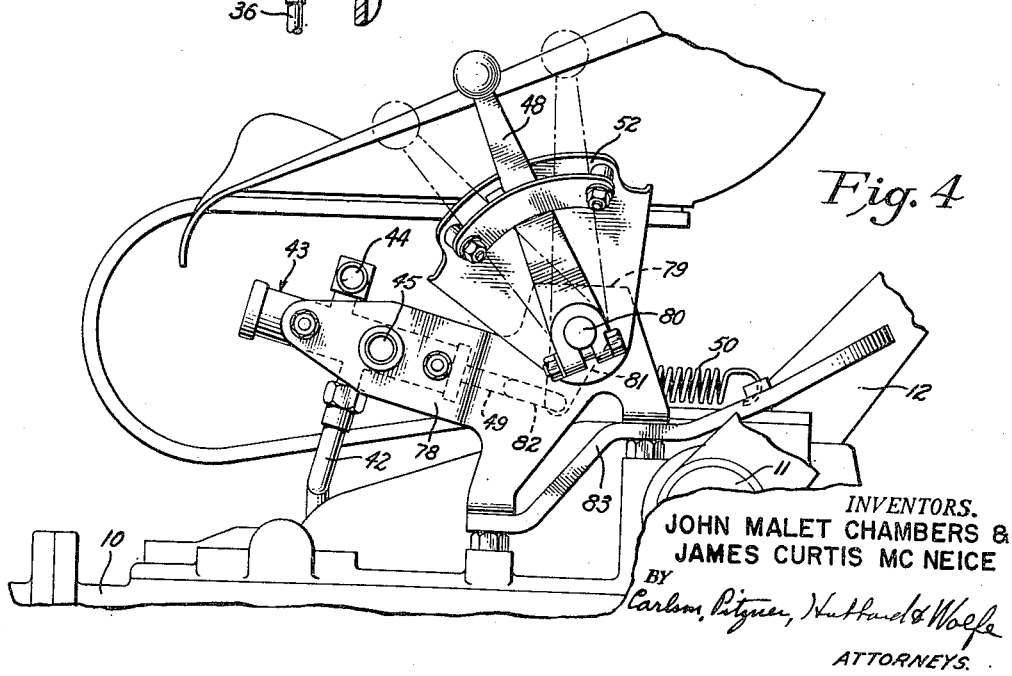
Fig. 4 is a side elevational view of the tractor similar to Fig. 2 but taken from the opposite side.

Referring to Figs. 2–4 of the drawings, there is shown by way of illustration a part of the body, that is the center housing 10 of a tractor equipped with the hydraulic lift system, the operative elements of which are shown in Fig. 1. It will be understood, of course, that suitable draft links (not shown) are trailingly pivoted to the housing for attachment of an implement to the tractor. The draft links are arranged to be swung vertically for raising and lowering the implement by the hydraulic apparatus (shown in Fig. 1) acting through a rockshaft 11 journaled on the tractor housing and having lift arms 12 suitably connected with the draft links. The lift shaft 11 is rotatable for raising the draft links by a main hydraulic actuator or ram comprising a cylinder 13 (Fig. 1) with a working piston 14 operatively connected by a rod 15 with a crank arm 16 rigid with the shaft 11.

Pressure fluid is supplied to the ram cylinder by a pump 20 driven from the tractor engine in well-known manner and under control of valve mechanism 21. The pump and associated valve mechanism are mounted within the housing 10, the lower portion of which constitutes a sump or reservoir 22 for the fluid utilized in the hydraulic system.

The valve mechanism 21 in the preferred form illustrated in Fig. 1 comprises a plunger 23 shiftable axially within a casing 24 from a central or "neutral" position in which it is shown in one direction to what may be called the "raising" position and in the other direction to what may be called the "drop" position. When shifted to the left (as viewed in Fig. 1), or toward the "raising" position, the plunger 23 uncovers an intake passage 25 for the pump 20 and the pump delivers fluid under pressure by way of a conduit 26 into the ram cylinder 13. When the valve plunger is shifted in the opposite direction or toward the "drop" position, the pump intake remains closed so that no fluid is delivered by the pump but a drain passage 27, connecting with the conduit 26 is opened permitting fluid to exhaust from the ram cylinder into the sump 22. In practice, the outlet for the drain passage is restricted so that the exhaust of fluid from the ram is relatively slow and downward movement of the draft links is correspondingly slowed. In the central or "neutral" position of the valve plunger 23, both the pump inlet and the drain passages are blocked so that fluid is locked in the ram cylinder and the draft links and implement connected thereto are held in a fixed position.

In the normal operation of the tractor the valve plunger 23 is positioned jointly by a manual controller in the form of a hand lever 30, commonly called the quadrant lever, and means responsive to the draft load imposed on the hitch linkage. The draft responsive means as herein shown includes a control plunger 31 (Figs. 1 and 2) with which is associated a relatively stiff control spring 32. One end of the control plunger is connected to a rocker or shackle 33 pivoted on the tractor body and in turn connected with the implement through the medium of a top or control link 34. The control plunger 31 extends into the housing 10 and is connected through a suitable linkage indicated at 35 with the plunger 23.

Hand lever 30 also acts through the linkage 35 to position the valve in the manner described in detail in the above-mentioned Ferguson patent. For present purposes it is sufficient to note that upward movement of the hand lever tends to shift the valve plunger to the "raising" position while downward movement tends to shift the plunger to the "drop" position. In some intermediate position of the hand lever (depending upon the force acting on the control plunger) the valve plunger will be set in "neutral" position.

Tractors of the type above discussed are commonly provided with a branch passage leading from the pump discharge passage to a tapped outlet port or the like opening exteriorly of the housing 10 for attachment of a conduit 36 through which pressure fluid from the pump may be supplied to one or more auxiliary actuators. The auxiliary actuator or actuators are thus connected in parallel with the main ram cylinder 13. In the particular tractor illustrated, the outlet port opens in one edge of a cover plate 37 (Fig. 2) closing the bottom of the housing 10 and the conduit 36 is connected thereto by a suitable fitting 38.

The novel control mechanism constituting the invention is interposed between the source of pressure fluid, that is, the pump 20, and the auxiliary actuator or actuators supplied with fluid thereby. Thus, as shown in Fig. 1, the conduit 36 leads to a multi-purpose valve 40 conveniently called a combined dump and overload release valve. From this valve a drain or exhaust passage 41 leads back to the sump 22 and a supply conduit 42 leads to a selector valve 43. While the valve 43 may be constructed to provide for selection between any desired number of auxiliary actuators, the particular valve illustrated is designed for use with two sets of actuators, such, for example, as those employed in a front end loader of the type disclosed in the co-pending Chambers and Sherwen application Serial No. 214,254, filed March 7, 1951, now Patent No. 2,701,072, issued February 1, 1955. Accordingly, the valve is arranged to selectively connect the conduit 42 with either of the conduits 44 and 45 which extend from the valve to the respective actuators.

The valve 43 as shown has a double-waisted plunger or spool 46 reciprocable in a chamber defined by a casing 47. The conduits 42, 44 and 45 open into the chamber at points spaced longitudinally therealong so that the spool, when in the position shown in Fig. 1, establishes communication between the conduits 42 and 44. In the alternate position of the spool, conduit 42 is connected to the conduit 45, while in the intermediate or "neutral" position, all of the conduits are closed by the full diameter portions of the spool.

For shifting the valve spool between its various positions, there is provided a hand lever 48 pivoted intermediate its ends on a stationary portion of the tractor and connected at its lower end with a stem 49 rigid with the spool. When one of the actuators is normally first to operate, the valve spool may be biased to the position for opening the supply passage to such actuator as by a spring 50 acting on the hand lever 48. Suitable means such as a stop element 51 mounted on an arcuate guide or quadrant 52 operatively associated with the hand lever may be provided for retaining the lever and valve spool in the "neutral" position.

In accordance with one aspect of the invention, the hydraulic valve 40 is constructed and incorporated in the hydraulic system in a novel manner which enables it to perform a plurality of functions, at least one of which is under control of the quadrant lever 30 provided on the tractor for controlling the tractor hydraulic system. In its preferred form, as shown in Fig. 1, the valve 40 comprises an elongated casing 55 defining end chambers 56 and 57 respectively communicating with the supply conduit 36 and the drain passage 41. Between the two end chambers is an intermediate chamber 58 communicating with the end chambers through passages 59 and 60 and opening into the conduit 42 leading to the selector valve.

The inter-chamber passage 60 is formed at its upper end with a seat for a ball valve element 61 which is normally urged against the seat by a spring 62 acting on a collar 63a fixed to a stem 63 extending upwardly from the valve element. The arrangement is such that the passage 60 is blocked until the pressure head in the intermediate chamber 58 exceeds a value such that the valve member is shifted from the seat against the force exerted by the spring 62 to open the passage and permit the flow of pressure fluid into the chamber 57 and thence through the drain passage 41 to the sump.

The pressure relief action of the valve 40 prevents the development of excessive pressure in the system through overloads imposed on either the main ram or on the auxiliary actuator connected to the hydraulic system. Such overload may occur through rapid deceleration or "bouncing" in transport of the load carried by the ram or the actuator. Preferably a non-return or check valve is interposed in the supply conduit 36 to prevent pressure conditions in the auxiliary actuator from affecting the main control valve. This check valve also restricts the discharge of fluid from the auxiliary actuators through the drain passage 41 under control of the valve 61.

The check valve may conveniently comprise a ball valve element 64 housed in the valve chamber 56 and urged by a spring 65 to a position to block fluid flow from the valve chamber into the conduit 36. The spring, of course, permits the valve element to move to open position to accommodate the flow of pressure fluid from the conduit to the valve chamber.

Provision is made for opening the relief valve manually to vent the auxiliary actuator to the sump when desired. For convenience of control, such actuation is effected through the medium of the same hand lever employed for control of the lifting ram of the tractor, namely, the quadrant lever 30. To this end, the valve 40 is mounted on the side of the tractor housing 10 in close proximity to the quadrant lever and an actuating linkage or other suitable operating connection is interposed between the valve stem 63 and the quadrant lever.

As herein shown, the linkage comprises a lever 66 pivoted intermediate its ends on the tractor housing and having at one end a pivoted connection with the upper end of the valve stem 63. At its other end the lever 66 carries a follower roller 67 adapted to cooperate with a cam 68 fixed to the shaft 69 upon which the quadrant lever 30 is mounted. In the exemplary embodiment of the invention, the cam 68 is formed with a lobe 68a shaped and positioned so as to open the relief valve when the quadrant lever is shifted through the "neutral" position toward the "drop" position.

In the operation of a tractor hydraulic system incorporating the auxiliary control mechanism, a supply of pressure fluid for the actuation of the auxiliary actuators is obtained by shifting the quadrant lever 30 into its lifting range which is the upper portion of its arc of travel, as indicated by the legend "LIFTING" in Fig. 1. This shifts the main valve plunger 23 to the "lift" position and pump 20 operates to supply fluid under pressure to the conduits 26 and 36.

Tractors, when operated with some types of equipment utilizing auxiliary actuators such, for example, as loaders of the type hereinbefore mentioned, ordinarily do not require the usual raising and lowering action of the draft links through their full range. Consequently means is commonly provided for preventing the links from being raised to the top position in which an automatic cutoff action is normally imposed on the hydraulic system. In other words, upward movement of the links is interrupted before the cutoff position is attained and consequently pressure fluid will be available as long as the quadrant lever remains in the "lift" position.

By suitably positioning the selector valve 43, pressure fluid may be directed to either of the auxiliary actuators as required or the actuators may be shut off from the supply conduit. When operations are completed, the quadrant lever 30 is returned to neutral position, that is, within the sector designated by the legend "NORMAL NEUTRAL ARC" in Fig. 1, to interrupt the operation of the pump and thus discontinue the supply of pressure fluid. In this connection it should be noted that in the normal operation of the tractor the neutral arc of the quadrant lever is relatively small and may be difficult to find under actual operating conditions. However, this is immaterial in the instant arrangement because the presence of the check valve 64 in the conduit 36 insures that so long as the main lever 7 is moved away from the "lift" or supply position, there will be an effective neutral condition for the auxiliary actuator in that oil may be trapped therein. The extent of this effective neutral arc is indicated by the legend "EXTENDED NEUTRAL ARC" in Fig. 1 and is governed by the construction and setting of the cam 68, that is, by the form and position of the lobe 68a.

Movement of the quadrant lever downwardly beyond the extended neutral arc and into the so-called "DUMPING ARC" causes the cam 68 to act on the follower roller 67 and lift the valve spindle 63 against the spring 62 and thus allow pressure fluid to return from the auxiliary actuators through the valve 40 and drain passage 41 to the sump. Thus the auxiliary actuators can return to unloaded position. It will be appreciated, of course, that the sequence in which the unloading of the auxiliary actuators takes place is determined by the position of the selector valve 43.

In addition to acting as an unloading or dump valve, as above described, the valve 40 also acts as a relief valve to prevent overloading of the system. It functions in this manner both when fluid is being supplied from the pump to the auxiliary actuators as well as when there is no supply from the pump. In the latter case the action is dependent on the selector valve connecting one or the other of the auxiliary actuators to the system, the actuator, of course, being the one subject to overload due to "bouncing" or the like of a sustained load during transport or due to excessive pressure induced by rapid deceleration of a sustained load. The tractor hydraulic system is protected against load-induced excessive pressure by the check valve 64 while the relief valve 61 protects what may be termed the external hydraulic system against the effect of such overloads.

The selector valve 43 may be locked in the "neutral" position through engagement of the hand lever 48 with the stop 51 when desired. In this position it effectively blocks the conduits 44 and 45 leading to the auxiliary actuators and also the supply conduit 42. Blocking of the latter conduit is advantageous in preventing leakage of fluid from the system when the auxiliary actuators are to be disconnected from the system. Furthermore, with the supply conduit 42 blocked, the tractor hydraulic system may be utilized in the normal manner if desired.

Turning now to a more detailed description of the components of the improved control mechanism and referring particularly to Figs. 2–4 of the drawings, the casing 55 of the dump and relief valve may be conveniently formed integrally with or rigidly mounted on a cover plate 70 closing an access opening in the side wall of the housing 10. As indicated heretofore, the supply conduit 36 connects to the usual hydraulic power takeoff port of the tractor and, in this instance, its upper end connects with the lower end of the valve casing 55. The conduit 42 connects with a laterally opening port intermediate the ends of the valve casing, while the drain or exhaust passage 41 may constitute simply a hole opening through the cover plate 70 into the interior of the housing 10 which defines the sump 22.

The actuating connection between the valve 40 and the quadrant lever includes the lever 66 previously mentioned which, as shown in Fig. 3, is pivotally supported by a pin 71 on an outwardly projecting arm 72 of a bracket bolted or otherwise mounted on the tractor housing. To provide for the convenient disassociation of the valve assembly from the quadrant lever so that the tractor may be operated in the normal manner without requiring complete removal of the valve assembly, the lever is formed at its outer end with a stub shaft portion 73 upon which the cam 67 is rotatably mounted. A cross pin 74 inserted through a transverse aperture in the shaft serves to retain the follower roller in place and the pin in turn is retained in operative position by means of a conventional locking ring 75 having its offset end portions socketed in the head 76 of the pin.

Also forming a part of the lever 66 is a shaft portion 77 disposed at right angles to the shaft portion 73 upon which the follower roller can be stowed when not in use. In that position, the follower is clear of the cam 68 and therefore not subject to operation by the quadrant lever. The valve assembly may therefore be left in place and if desired it may be utilized for overload release purposes in place of the relief valve provided for that purpose in the tractor hydraulic system. The valve 40 has the advantage of being more accessible for cleaning and inspection than the regular relief valve which is located inside the housing 10.

For convenience of assembly and mounting on the tractor, the selector valve 43 is preferably supported on a bracket 78 which has an extension 79 at the outer end of which the guide or quadrant 52 is formed. The valve operating lever 48 is supported in this bracket assembly by a shaft 80 which has a radial arm 81 connected with the valve stem 49 through the medium of a pivoted link 82. As shown, the bracket 78 is bolted to the top of a C-shaped bracket 83 which, in this instance, forms a part of the attachment means for the loader heretofore referred to.

The improved control mechanism affords the advantages of relatively simple control in that the maximum use is made of the usual quadrant lever 30 which not only controls the normal tractor hydraulic system but also controls the valve 40 insofar as it functions as a release or dump valve. The selector valve 43 is biased to a position to insure actuation of the auxiliary actuator that is to be operated first so that the operator requires only one hand for manipulation of the hydraulic control assembly. This is particularly desirable in case the tractor is moving when the first auxiliary actuator is operated. By reference to Fig. 3, it will be observed that the quadrant lever and the combined dump and relief valve are located at the right side of the tractor whereas the hand lever 48 for the selector valve is located at the left side of the tractor. Thus the operator can manipulate both valves simultaneously when desired.

The control mechanism is simple in construction and can be easily installed in the tractor without requiring any structural changes in the parts normally supplied with the tractor. Moreover, the mechanism may be left in place when not in use and disassociated from the controls so that the tractor may be used in the normal manner.

We claim as our invention:

1. For use with a tractor having a hydraulic system including a main actuator and a pump enclosed within the body of the tractor for supplying pressure fluid to the main actuator, an auxiliary actuator located externally of the tractor body, a supply conduit connected to receive fluid from the pump and leading to the auxiliary actuator and a hand lever supported externally of the tractor body and swingable through a predetermined arc to control the delivery of pressure fluid from the pump to the main actuator and the supply conduit and to control the exhaust of fluid from the main actuator, a valve assembly adapted to be interposed in the conduit ahead of the supply conduit leading to the auxiliary actuator comprising a first spring biased valve member operative to prevent flow of fluid from the auxiliary actuator toward the pump, a second spring biased valve member operative to open the hydraulic system to exhaust when the pressure head therein exceeds a predetermined value, and actuating means operable by the hand lever for shifting said second valve member to open position against the action of its biasing spring.

2. For use with a tractor having a hydraulic system including a main actuator and a pump enclosed within the body of the tractor for supplying pressure fluid to the main actuator, an auxiliary actuator located externally of the tractor body, a supply conduit connected to receive fluid from the pump and leading to the auxiliary actuator and a hand lever supported externally of the tractor body and swingable through a predetermined arc to control the delivery of pressure fluid from the pump to the main actuator and the supply conduit and to control the exhaust of fluid from the main actuator, a valve assembly including a check valve adapted to be interposed in the system ahead of the supply conduit leading to the auxiliary actuator, an exhaust conduit extending from said valve assembly to a sump within the tractor body, a valve member in said valve assembly controlling communication between the supply conduit and said exhaust conduit, a spring yieldably urging said valve member to a position to interrupt communication between the conduits and permitting movement of the valve member to open position when the pressure head in the system exceeds a predetermined value, and actuator means for said valve member positioned for operation by the hand lever and movable thereby into open position.

3. A valve assembly as defined in claim 2 having means for supporting it externally of the tractor body in a position such that the hand lever when operated to initiate exhaust of fluid from the main actuator is also effective to move said valve member to open position to vent the supply line leading to the auxiliary actuator.

4. For use with a tractor having an implement lift powered by a main hydraulic actuator supplied with pressure fluid by a pump and under control of a valve shiftable between lift and lowering positions through a neutral position by means of a movable hand lever, conduit means connected in the system to deliver pressure fluid to an auxiliary hydraulic actuator in parallel with the main actuator, a check valve in said conduit means ahead of the auxiliary actuator, and a spring biased relief valve in said conduit means between said check valve and the auxiliary actuator.

5. A relief valve assembly as defined in claim 4 having actuating means operable upon movement of the hand lever to lowering position to open the relief valve for venting the main actuator and the conduit means connected with the auxiliary actuator.

6. For use with a tractor having an implement lift powered by a main hydraulic actuator supplied with pressure fluid by a pump and under control of a valve shiftable between lifting and lowering positions by a movable hand lever, conduit means extending from the delivery side of the pump, a plurality of auxiliary actuators, control mechanism comprising a selector valve operable to direct the flow of pressure fluid through said conduit to a selected one of said plurality of auxiliary actuators, a combined relief and dump valve interposed between said conduit and said selector valve, and a check valve interposed in said conduit between the pump and said combined valve.

7. Control mechanism as defined in claim 6 wherein said selector valve is biased to a position to direct pressure fluid to a particular one of the auxiliary actuators and movable manually to a position to direct pressure fluid to the other auxiliary actuator.

8. Control mechanism as defined in claim 7 wherein means is provided for retaining the selector valve in a neutral position in which it effectively blocks flow of pressure fluid to or from all of the auxiliary actuators.

References Cited in the file of this patent

UNITED STATES PATENTS

| | | |
|---|---|---|
| 1,706,309 | Miller et al. | Mar. 19, 1929 |
| 2,592,393 | Chambers | Apr. 8, 1952 |
| 2,638,045 | Heitshu | May 12, 1953 |
| 2,659,307 | Framhein | Nov. 17, 1953 |